United States Patent [19]

Brym

[11] 3,901,089

[45] Aug. 26, 1975

[54] HYDROMETER ASSEMBLY

[75] Inventor: Stanley J. Brym, Torrington, Conn.

[73] Assignee: Baldwin-Gegenheimer Corporation, Stamford, Conn.

[22] Filed: Jan. 16, 1974

[21] Appl. No.: 433,905

[52] U.S. Cl. .................................. 73/441; 73/446
[51] Int. Cl.² .......................................... G01N 9/14
[58] Field of Search .......... 73/441, 444, 446, 425.6, 73/442, 443

[56] References Cited
UNITED STATES PATENTS

| | | | |
|---|---|---|---|
| 1,025,543 | 5/1912 | Smith | 73/441 |
| 2,117,170 | 5/1938 | Hoyer | 73/441 |
| 2,162,020 | 6/1939 | Johnson | 73/441 |
| 3,302,462 | 2/1967 | Pursell | 73/425.6 |
| 3,699,348 | 10/1972 | Hocherl | 73/425.6 |

FOREIGN PATENTS OR APPLICATIONS

| | | | |
|---|---|---|---|
| 13,480 | 6/1914 | United Kingdom | 73/446 |

Primary Examiner—Herbert Goldstein
Attorney, Agent, or Firm—St.Onge Mayers Steward & Reens

[57] ABSTRACT

The hydrometer assembly comprises telescoping tubes of which the inner one is transparent or has a windowed area. In the fully telescoped state of the two tubes, clamping parts associated with them retain the hydrometer float in a locked position within the inner tube. The closure for the lower extremity of the outer tube includes a fine mesh screen so that extending of the tubes longitudinally permits a liquid which is to be evaluated to be drawn into and retained within the tube interior. The extension of the tubes also releases the hydrometer float which then rises in the in-drawn liquid to a level at which its scaled part can be read through the windowed part of the inner tube.

10 Claims, 6 Drawing Figures

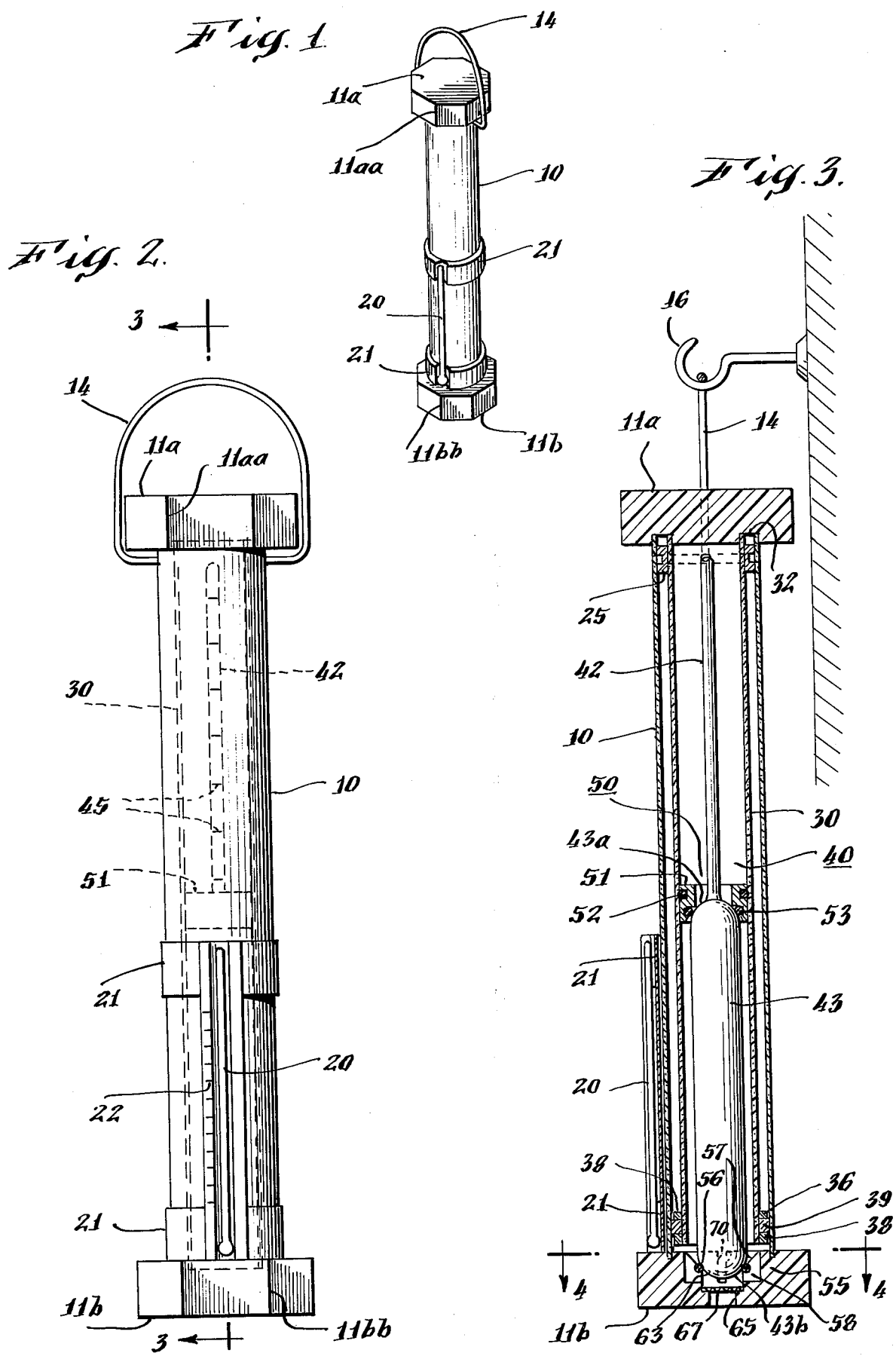

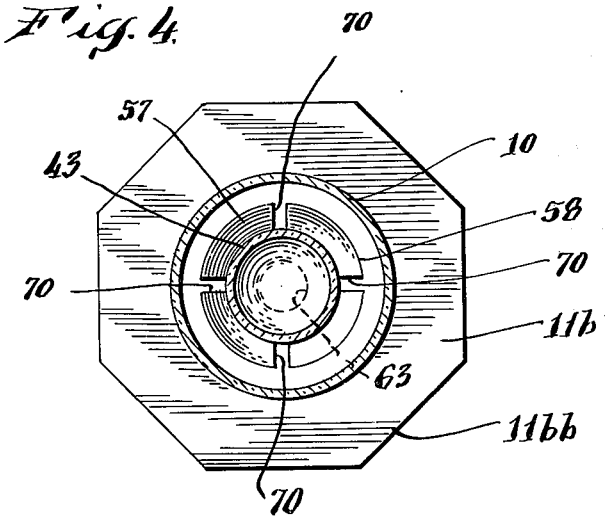
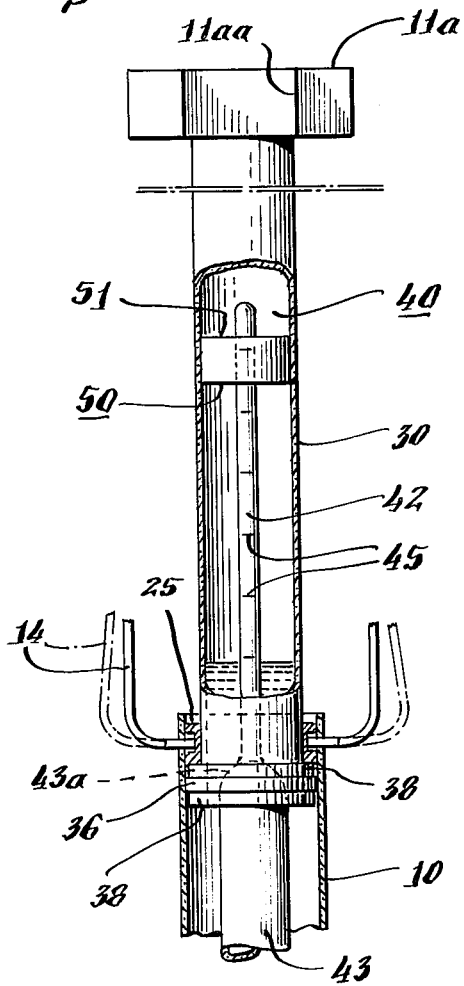
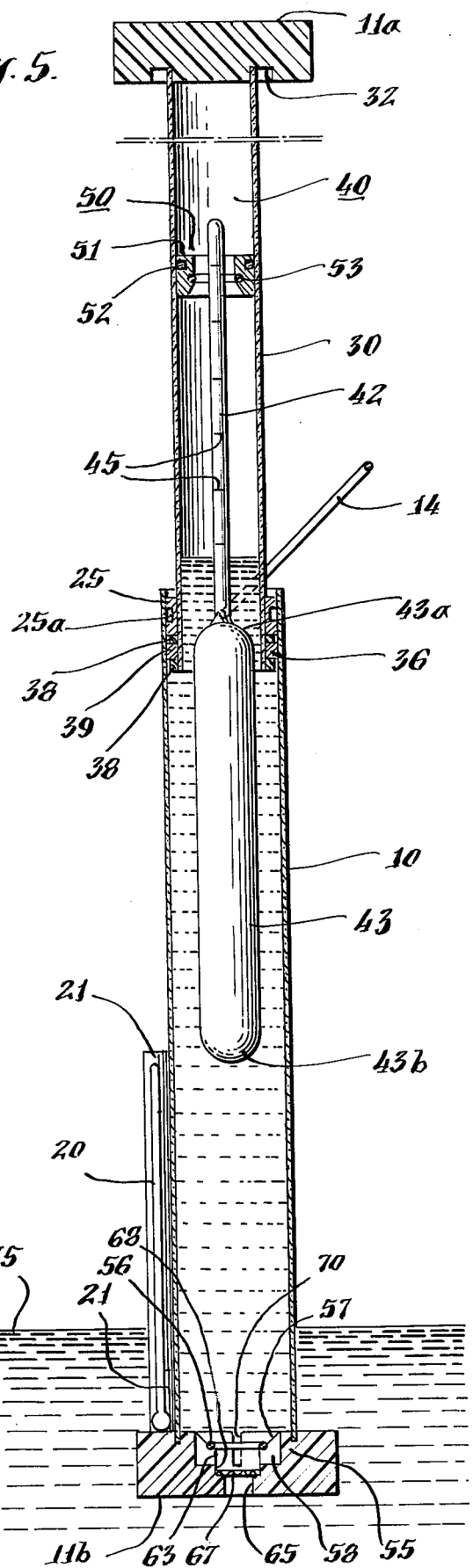

HYDROMETER ASSEMBLY

BACKGROUND

Hydrometers are frequently employed in the printing industry in contexts in which the supply of liquid to be evaluated is in a pan or other shallow container. In this usage, the necessary transfer of liquid to a secondary container deep enough for use of a hydrometer float often contaminates the liquid or otherwise introduces inaccuracy into the measuring operation. Also, the working environment of a print shop, for example, makes breakage of fragile measuring instruments a not infrequent occurrence.

It is an object of the present invention to provide an improved hydrometer assembly which is particularly adapted for use in the printing trades and in which the following advantages, among others, are realized:

a. full protection of the hydrometer float against breakage during both storage and use of the assembly;

b. convenience in use of the assembly for extracting and retaining a sample of the liquid to be evaluated; and c. substantial assurance against contamination of the evaluated liquid during the extracting and measuring procedure.

In brief, this object is accomplished by providing, in combination, a pair of interfitting tubes, within the innermost of which a hydrometer float is centrally positioned. When the two tubes are compressed into their most fully telescoped condition, the hydrometer float is protectively anchored by them at two or more spaced points. On the other hand, when the tubes are moved into relatively extended position, first, the hydrometer float is freed for longitudinal movement, and, second, pneumatic suction is developed within the tubes such that a liquid desired to be evaluated may be drawn into their interior space through a liquid-permeable closure of special character to be described. One of the tubes is transparent at a region which, in the extended condition of the tubes, corresponds to the expected level of the in-drawn liquid. Accordingly, the scaled area of the hydrometer, which will be floated at this level, can be read through the wall of the tube. Restoration of the tubes to their collapsed position will expel the evaluated liquid and once again put the hydrometer float in a secured condition.

Details of the invention may be understood by reference to the following specification and the accompanying drawings in which:

FIG. 1 is a perspective view of a hydrometer assembly in accordance with the invention, and shown in its fully telescoped condition;

FIG. 2 is a side elevation (from a slightly different angle) of the assembly of FIG. 1:

FIG. 3 is a section taken on line 3—3 of FIG. 2;

FIG. 4 is a section taken on line 4—4 of FIG. 3;

FIG. 5 is a section similar to that of FIG. 3, but showing the hydrometer assembly in its fully extended condition; and FIG. 6 is a view partly broken away and at right angles to that of FIG. 5, which illustrates the measuring function of the hydrometer float.

In its fully telescoped condition the hydrometer assembly appears as shown at FIG. 1. As there pictured, it includes an outer tubular enclosure 10 and is bounded at its extremities by similar stoppers or caps 11a and 11b of an appropriate inert plastic. Each of these caps has a polygonal (e.g. octagonal) peripheral edge, and is thus provided with a plurality of flattened lateral surfaces, these being respectively indicated at 11aa and 11bb at the opposite ends of the assembly. The corresponding ones of these axially spaced surfaces are in identical planes, so that each pair of surfaces provides a planar support for the assembly if it falls upon or is intentionally laid upon its side. In this way, the assembly is protected against rolling off a table or other elevated surface on which it may be placed. Moreover, the lower stopper 11b provides a flattened surface of substantial area perpendicular to the axis of the tube 10 upon which the assembly may be stably supported in an upright position when this is found desirable.

At its upper end, the tube 10 is provided with a flexible bale 14 by which the assembly may be hung for convenient storage as indicated at 16 in FIG. 3. As best appears in FIG. 6, the extremities of the bale pass through the wall of the tube 10 and extend into an annular channel 25a formed in a collar part 25 which fits loosely within tube 10. The bale thus locks the collar within the tube 10, but in such fashion that by springing the bale free, the collar can be removed. This permits the structural parts within tube 10 to be removed and replaced when this is desirable. At its lower end, the tube 10 supports an externally mounted thermometer assembly 20 which is attached to the tube by metallic or plastic securing rings 21. This assembly includes a conventional scale part 22 as best shown in FIG. 2.

Referring now to FIG. 3, it will be seen that the tube 10 encloses a second tube 30, the outer diameter of which is less than but a substantial fraction of the internal diameter of the tube 10. Moreover, the tube 30 is substantially coextensive in length with the tube 10. As is best seen in FIG. 5, the tube 30 has an impervious closure at its upper end comprising the cap or stopper part 11a already referred to, the tube being attached to this part by being adhesively or otherwise hermetically secured to the innermost wall of an annular groove 32 formed on the underside of 11a. The tube 30 is aligned concentrically with the tube 10 by the combination of the collar 25 (removably secured within the tube 10, as previously indicated) and a second collar or sleeve 36 which is secured externally to the tube 30. Each of these collars has a sliding fit with the tube to which it is not attached and the collar 36 is given an air-tight contact with tube 10 by the combination of retaining rings 30 and a packing ring 39. Because of the sliding relationship of the two tubes, it is possible by separately grasping the cap 11a and the tube 10 to withdraw the tube 30 from the fully telescoped position which it occupies in FIGS. 1–3 and to bring it to the withdrawn position shown in FIGS. 5 and 6. In the lastmentioned position, it is blocked from further upward motion by interaction of the upper retaining ring 38 and the collar 25. The object and effect of the tube withdrawl just described will be discussed at a later point, but, as will appear in connection with that discussion, it is essential to the intended operation of the apparatus that the tube 30 be either transparent in its entirety or at the least, have an intermediate window portion through which the interior of the tube can be clearly seen by a user of the hydrometer assembly. If complete transparency is desired, the tube as a whole may be made either of glass or of a chemically resistant transparent plastic.

Referring now once again to FIG. 3 there is provided within the tube 30 a hydrometer float 40 having a narrow elongated part 42 and an attached bulbous float part 43 the diameter of which is less than but a substantial fraction of the internal lateral dimension of the tube 30. The part 42 bears a scale, indicated by markings 45 in FIGS. 2 and 6, which is calibrated to be indicative of the specific gravity of a liquid in which the bulbous part is permitted to float freely. The bulbous part 43, on the other hand, terminates in oppositely directed dome-like surfaces 43a and 43b. In the condition of the hydrometer assembly shown in FIGS. 1 through 3, it will be seen that the float 40 is immobilized by virtue of the fact that the opposed extremities 43a and 43b of the bulbous part 43 are embraced between a first clamping means 50 attached to the interior wall of the inner tube 10 and a second clamping means 55 associated with the outer tube at its lower end. In the specific embodiment shown, the clamping means 50 comprises a two-tiered annular collar 51 resiliently retained within the tube 10 by an elastomeric O-ring 52 and having attached to its downwardly directed surface a second elastomeric O-ring 53 which is of such size as to bear upon an intermediate area of the domed float surface 43a. The clamping means 55 comprises a still further elastomeric O-ring 56, similar in diameter to the ring 53 and appropriately secured to the upper outwardly flared surface 57 of an annular collar 58 retained in the closure cap 11b. When the bulbous float part 43 is compressively secured between the O-rings 53 and 56 in the manner indicated, it will be understood that the float as a whole is completely shielded against jarring contact with the wall of the tube 10 no matter how roughly the hydrometer assembly may be handled during its periods of non-use. By this means the likelihood of breakage of the float because of careless treatment is greatly reduced.

Referring now to the lower extremity of the hydrometer assembly, and particularly to FIGS. 3 and 5 of the drawing, it will be seen that the cap 11b is made liquid permeable by provision of a circular bottom opening 65 in which is inserted by a fine-mesh, corrosion resistant screen 67. This screen, which preferably has a mesh size of about 60 to 100 mesh, may be constituted of stainless steel or other corrosion-resistant material. It is seated and secured in a circular recess 68 slightly larger than the opening 66. This recess has open communication with the interior of the tube 10 not only through the central aperture of the sleeve 55 but also through a series of upwardly directed slots 70 which are formed in this sleeve. As will further appear, while the screen 67 is dimensioned to pass liquid readily under atmospheric pressure, it is also fine enough to restrain gravity-induced drainage from within the assembly once a quantity of liquid has been introduced through the screen.

In use of the apparatus, the bottom surface of the cap 11b is immersed in a supply of the liquid which is to be tested as to its specific gravity. This immersion is indicated in FIG. 5, in which 75 represents the surface of the test liquid. At the moment of initial immersion, the hydrometer assembly should be in its fully telescoped condition as shown, for example, in FIG. 3. However, following immersion, and with the outer tube part 10 maintained in relatively fixed position, the cap 11a and the inner tube 30 are drawn upwardly to the limiting position shown in FIG. 5. It will be apparent that by this action the total enclosed space will be increased by approximately the volume of the tube 10. Accordingly, in the situation represented in FIG. 6 a quantity of liquid corresponding to this added volume will be drawn from the supply source 75 through the opening 65 and the screen 67 into the interior of the tube 10. It is to be observed that part of the space within that tube is occupied by the bulbous portion 43 of the hydrometer float 40. Accordingly, because of the substantiality of the diameter of this part in relation to the diameter of the tube 30, as previously specified, the volume which it displaces will be sufficient to raise the effective level of the in-drawn liquid into the intermediate part of the tube 30 as shown in FIG. 5. Accordingly the scale-bearing portion 42 of the hydrometer float will ride within the tube 30 approximately as indicated in FIGS. 5 and 6. Because of the previously specified transparency of the tube 30 (at least in the critical intermediate region within which the float portion 42 may be expected to appear), the float scale can be read directly. Subject to any temperature correction indicated by a concurrent reading of the thermometer 20, a determination of the specific gravity of the enclosed liquid can be quickly arrived at.

To permit the mode of operation just described, the relationship of the diameter of the inner tube 30 to the diameter of the hydrometer float bulb is of considerable importance since the latter dimension determines the volume of liquid that will be displaced upwardly into the tube 30, and the former dimension determines the level to which this displaced liquid will rise. For easy readability, it is desired that the liquid level rise several (for example, two) inches above the bottom surface of retaining ring 38. To achieve this, the ratio of the float diameter to the inner diameter of tube 30 should preferably be in the range of approximately 0.6:1 to 0.8:1. This diameter of the tube 10 is less critical because this serves mainly as an enclosure for the combination of the inner tube and the float.

While the mesh screen 67 incidentally acts as a filter for the liquid drawn into the tube 10, its more important function is to retain the in-drawn liquid even though the bottom end of the hydrometer assembly is withdrawn from the liquid pool 75 (FIG. 5). This is possible with the range of mesh sizes previously specified, because, within this range, the surface tension of liquids ordinarily subject to testing is great enough to permit a considerable body of liquid to be sustained above the plane of the mesh. In practical fact, of course, the weight of the liquid is supported mainly by the partial vacuum above it, while the surface tension coaction between the liquid and the mesh 67 creates a barrier which keeps air from migrating upward through the mesh and destroying the vacuum. That is to say, the fine mesh screen provides a closure means, dependent upon surface tension established at a liquid-air interface, for preventing co-mingling of the two media.

Following its use in the way described above, the hydrometer assembly may be re-collapsed to expell the enclosed liquid through the opening 65, and, after any desired cleaning operations, may be hung in a convenient place as suggested in FIG. 3. As previously explained, the telescoping of the tubes 30 and 10 for storage purposes will again clamp the hydrometer float in the safe-guarding arrangement shown in FIG. 3. It will be seen, therefore, that the invention provides a hydrometer assembly which not only affords high convenience in use, particularly in a print-shop environment, but also has both storage and self-packaging features which afford maximum protection against breakage.

Additional advantages include the following:

a. The screen 67 not only acts as a filter but, because of its fine mesh, effectively stops air from entering through it and thus disturbing the partial vacuum created in the upper portion of the tube 30. Accordingly, the hydrometer assembly may be raised to eye level for easier viewing of the scale 45 without concern about loss of fluid - at least for fluids of the surface tensions associated with practical printing liquids.

b. A more accurate reading is assured since the test solution is drawn up into the assembly under conditions which preclude its being aerated.

c. The assembly becomes a shipping container for the hydrometer, so that the hydrometer float need never be touched from factory to user.

In a given commercial embodiment of the invention the tube 10 has a length of 10 inches and an internal diameter of 1⅜ inches; the tube 30 is of similar length and has an external diameter of 1⅛ inches and a wall thickness of 1/16 inch; and the hydrometer float bulb is 0.730 inches in diameter and approximately 5½ inches long.

While the invention has been described by reference to a particular embodiment, the following claims are intended to cover equivalent constructions which are within the true spirit and scope of the invention.

I claim:

1. A hydrometer assembly comprising
   A. an outer tube having a closure at its lower end which is nevertheless sufficiently permeable to permit liquid under pneumatic pressure to pass through the closure into the tube;
   B. an inner tube slidingly inserted within the upper part of the outer tube and so limited in length as to be substantially wholly enclosed by the outer tube when the two tubes are in their most fully telescoped condition, the inner tube having
      1. an impervious closure at its upper end and
      2. a transparent lateral wall portion;
   C. an elongated hydrometer float within the inner tube which is of such transverse dimension in relation to the transverse dimension of the inner tube as normally to be freely movable within the inner tube; and
   D. clamping means within the inner tube and operative when the two tubes are in their most fully telescoped condition to fixedly secure the hydrometer float between itself and cooperating clamping means associated with the outer tube, but operative when the two tubes are in their most extended condition to free the hydrometer float for axial motion within the tubes;
   E. the two tubes having their respective transverse dimensions so related that when the tubes are in their most extended condition, liquid drawn into them through the said permeable closure during the act of extension will, in the presence of the hydrometer float, find its upper level at a region corresponding to the then location of the transparent wall portion of the inner tube.

2. A hydrometer assembly according to claim 1 in which the two clamping means respectively comprise elastomeric parts sized and positioned to compressively engage between them oppositely directed longitudinally spaced surfaces of the hydrometer float.

3. A hydrometer assembly according to claim 1 in which the closure for the outer tube has a flattened outer surface perpendicular to the axis of the tube upon which surface the assembly may be stably supported.

4. A hydrometer assembly according to claim 3 in which the permeable aspect of the closure for the outer tube comprises a fine-mesh screen through which liquid may be drawn into the interior of the tube.

5. A hydrometer assembly according to claim 1 in which at least one of the said closures has a polygonal peripheral edge to prevent the assembly from rolling when laid on its side.

6. A hydrometer assembly comprising
   A. an outer tube having a closure at its lower end which is nevertheless sufficiently permeable to permit liquid under pneumatic pressure to pass through the closure into the tube;
   B. an inner tube slidingly inserted within the outer tube and of such length as to be substantially wholly enclosed by and substantially coextensive in longitudinal extent with the outer tube when the two tubes are in their most fully telescoped condition, the inner tube having
      1. an impervious closure at its upper end,
      2. a transparent lateral wall portion, and
      3. an external transverse dimension which is a substantial fraction of the internal transverse dimension of the outer tube;
   C. a hydrometer float within the inner tube, said float having
      1. a narrow elongated scale-bearing part and
      2. a bulbous float part the diameter of which is less than but a substantial fraction of the internal lateral dimension of the inner tube;
   D. a first annular elastomeric clamping means within the outer tube near its lower extremity and having its inner diameter slightly less than that of the bulbous part of the hydroscopic float;
   E. a second annular clamping means within the inner tube which, when the two tubes are in their most fully telescoped condition, is spaced from the first clamping means by a distance corresponding to the axial dimension of the bulbous part of the hydroscopic float, whereby that part is (with the tubes in telescoped condition) compressively embraced by the two clamping means;
   F. the relative dimensions of the two tubes and the hydroscopic float being such that when the tubes are in their most extended condition, liquid drawn into them through the said permeable closure during the act of extension will find its upper level at a region corresponding to the then location of the transparent wall portion of the inner tube.

7. A hydrometer assembly according to claim 6 in which the closure for at least one of the two tubes has a flattened outer surface perpendicular to the axis of the tube upon which surface the assembly may be stably supported.

8. A hydrometer assembly according to claim 7 in which the respective outer peripheries of the closures for the inner and outer tubes have identical polygonal configurations effective to constrain the assembly from rolling when laid on its side.

9. A hydrometer assembly according to claim 6 in which permeability is imparted to the lower closure by inclusion in its structure of a mesh screen coarse enough to pass fluid under atmospheric pressure but fine enough, in the presence of a partial vacuum within the assembly, to restrain gravity-induced drainage of liquid from within the assembly.

10. A hydrometer assembly comprising
A. an outer tube;
B. an inner tube inserted within the outer tube and extending substantially the full length of the outer tube when the two tubes are in their most fully telescoped condition, the inner tube having
   1. a transparent lateral wall portion,
   2. an impervious closure at its upper end, and
   3. an air-tight sliding contact at its lower end with the inner wall surface of the outer tube;
C. a hydrometer float within the inner tube, said float having
   1. an upper elongated scale-bearing part and
   2. a lower bulbous float part the lateral dimension of which is less than but a substantial fraction of the internal lateral dimension of the inner tube; and
D. a liquid-permeable closure for the lower end of the outer tube comprising a screen of approximately 60 to 100 mesh, whereby upon partial withdrawal of the inner tube from the outer tube liquid may pneumatically be drawn into the outer tube through the closure; said closure comprising means effective in coaction with the surface tension of the in-drawn liquid, and in the presence of a partial vacuum within the assembly, to prevent gravity-induced drainage of such liquid from the outer tube through the closure.

\* \* \* \* \*